United States Patent [19]

Isaac et al.

[11] Patent Number: 5,744,791
[45] Date of Patent: Apr. 28, 1998

[54] SOLAR ENERGY-POWERED OPTICAL READER

[75] Inventors: Richard Isaac, East Northport; Reuven Shapira, Plainview; Simon Bard, Setauket, all of N.Y.

[73] Assignee: Symbol Technologies, Inc., Holtsville, N.Y.

[21] Appl. No.: 820,048

[22] Filed: Mar. 18, 1997

Related U.S. Application Data

[62] Division of Ser. No. 686,157, Jul. 24, 1996, which is a division of Ser. No. 407,577, Mar. 30, 1995, Pat. No. 5,600,121.

[51] Int. Cl.$^6$ ..................................... G06K 7/10
[52] U.S. Cl. .......................................... 235/472; 235/455
[58] Field of Search .................................. 235/455, 472

[56] References Cited

U.S. PATENT DOCUMENTS 5,450,491  9/1995  McNair .................. 238/472 X

*Primary Examiner*—Harold Pitts
*Attorney, Agent, or Firm*—Kirschstein et al.

[57] ABSTRACT

A radiant energy source, e.g., solar energy, is employed to power an electro-optical reader, preferably by charging an on-board battery. A solar light collector is mounted on the reader in a location exposed to ambient light.

10 Claims, 4 Drawing Sheets

SOLAR ENERGY-POWERED OPTICAL READER

This is a division of application Ser. No. 08/686,157, filed Jul. 24, 1996 which is a Div. of Ser. No. 08/407,577 filed Mar. 30, 1995, U.S. Pat. No. 5,600,121 issued Feb. 4, 1997.

BACKGROUND OF THE INVENTION

1. Field of the Invention

This invention generally relates to an apparatus for and a method of electro-optically reading indicia having parts of different light reflectivity, for example, bar code or matrix array symbols, and, more particularly, to optical readers powered by radiant energy sources.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a gas laser or semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol. At least one bar code reader has been proposed with two light sources to produce two light beams of different frequency.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codeabar, and Interleaved 2 of 5, etc.

In order to increase the amount of data that can be represented or stored on a given amount of surface area, several new bar code symbologies have recently been developed. One of these new code standards, Code 49, introduces a "two dimensional" concept for stacking rows of characters vertically instead of extending the bars horizontally. That is, there are several rows of bar and space patterns, instead of only one row. The structure of Code 49 is described in U.S. Pat. No. 4,794,239, which is herein incorporated by reference. Another two-dimensional symbology, known as "PDF417", is described in U.S. Pat. No. 5,304,786.

Still other symbologies have been developed in which the symbol is comprised of a matrix array made up of hexagonal, square, polygonal and/or other geometric shapes. Such symbols are further described in, for example, U.S. Pat. Nos., 5,276,315 and 4,794,239. Such matrix symbols may include Vericode, Datacode, and MAXICODE (all trademarks of their respective owners).

In the laser beam scanning systems known in the art, the laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both.

Bar code reading systems also include a sensor or photo-detector which detects light reflected or scattered from the symbol. The photo-detector or sensor is positioned in the scanner in an optical path so that it has a field of view which ensures the capture of a portion of the light which is reflected or scattered off the symbol. This light is detected and converted into an electrical signal. Electronic circuitry and software decode the electrical signal into a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the alpha numeric characters so represented.

The decoding process of known bar code reading system usually works in the following way. The decoder receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alpha numeric characters so represented.

Moving-beam laser scanners are not the only type of optical instrument capable of reading bar code symbols. Another type of bar code reader is one which incorporates detectors based on solid state imaging arrays or charge coupled device (CCD) technology. In such prior art readers the sides of the detector are typically smaller than the symbol to be read because of the image reduction by the objective lens in front of the array or CCD. The entire symbol is flooded with light from a light source such as lighting light emitting diodes (LED) in the scanning device, and each array cell is sequentially read out to determine the presence of a bar or a space.

The working range of CCD bar code scanners is rather limited as compared to laser based scanners and is especially low for CCD based scanners with an LED illumination source. Other features of CCD based bar code scanners are set forth in U.S. patent application Ser. No. 08/041,281 which is hereby incorporated by reference, and in U.S. Pat. No. 5,210,398. These references are illustrative of the earlier technological techniques proposed for use in CCD type scanners to acquire and read indicia in which information is arranged in a two dimensional pattern.

In an attempt to enable the user readily to position the hand-held reader so as to readily read the symbol, a variety of techniques of aiming the laser light at the indicia are known. U.S. Pat. No. 4,835,374 describes an aiming light arrangement to assist the user in visually locating and aiming the head at each symbol, the aiming light being a visible non-laser light source. Although the use of a discrete aiming light arrangement did assist the user in reliably aiming the head at the symbol for some applications, another system, disclosed in U.S. Pat. No. 5,117,098, used a multi-position trigger switch in a hand-held laser scanner. The head was arranged to be aimed at the symbol to be scanned during a first operational state in which an aiming pattern was emitted. Once the user had aligned the head properly with respect to the location of the symbol, the trigger switch was actuated again to put the device into a second operational state in which the beam was scanned across the symbol in the normal scanning or reading mode, and the symbol decoded. The same laser was used both to create the aiming pattern and the scanning beam.

European Patent No. 0355355 describes a combination bar code reader and EAS tag deactivator, including an embodiment with a multi-position trigger.

Another bar code reader with a multi-position trigger switch (for a rather different purpose) is disclosed in the article by Grabowski and Wohl, an IBM Technical Disclosure Bulletin, page 78, Volume 5, No. 5, October 1962.

Yet other aiming and scanning arrangements in which changing from one mode to another is performed in an automatic (i.e., non-manual) manner are described in the series of U.S. Pat. Nos. 4,933,538; 5,229,591; and 5,250,791 assigned to the present assignee.

SUMMARY OF THE INVENTION

Objects of the Invention

It is a general object of the present invention to provide an improved indicia scanner without the limitations of prior art readers.

Another object of the invention is to power a reader by a radiant energy source, e.g., solar energy.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

Features of the Invention

In keeping with these objects, and others which will become apparent hereinafter, one feature of this invention resides, briefly stated, in an optical reader for reading indicia having parts of different light reflectivity, e.g. two-dimensional or one-dimensional symbols having bars and spaces, which is manually and independently controllable, for performing one or more of the following functions in any desired sequence: (i) aiming; (ii) range finding; (iii) zooming, focusing or spot size adjustment; (iv) image capturing; and (v) flying spot scanning.

In accordance with this invention, a radiant energy source is employed to power the reader. Advantageously, a solar light collector is mounted on the reader in a location exposed to ambient light. The collected light is employed to charge a battery for hand-held, portable operation of the reader.

The novel features which are considered as characteristic of the invention are set forth in particular in the appended claims. The invention itself, however, both as to its construction and its method of operation, together with additional objects and advantages thereof, will best be understood from the following description of a preferred embodiment, which is described by way of example only, when read in conjunction with the accompanying drawing.

BRIEF DESCRIPTION OF THE DRAWING

FIG. 2a is an enlarged top plan view of a bar code reader with a trackball joystick) and a graphical user interface display according to the present invention;

FIG. 2b is a perspective view of the bar code reader of FIG. 2a;

FIG. 2c is an enlarged top plan view of the display of FIG. 2a; and

DETAILED DESCRIPTION OF THE PREFERRED EMBODIMENT

The invention, in the preferred embodiment, takes the form of a portable, hand held optical reader contained within a housing (or body) 10 of appropriate shape. The exact form of the housing 10 is not of importance, and may depend upon the particular application. A conventional gun-shaped housing would be suitable in many cases. The reader may also be arranged for hands-free use and could be fixed instead of being portable.

In the most rudimentary implementation, the invention provides a system for reading coded symbols with a light source for generating a beam directed toward a symbol to be read, a detector for receiving reflected light from the symbol to produce electrical signals corresponding to data represented by the symbol, a first actuator manually displaceable from an off position to a first selectable position for initiating reading of a symbol, and an independently operable second actuator is manually displaceable from a first position to a second position to transfer said data represented by the symbol. As an example, the data may be transferred to a printer, or to a display for visually displaying the data. The data may also be transferred to a radio frequency or IF transmitter for wireless communication of the data to a remote receiver.

Figure 1:
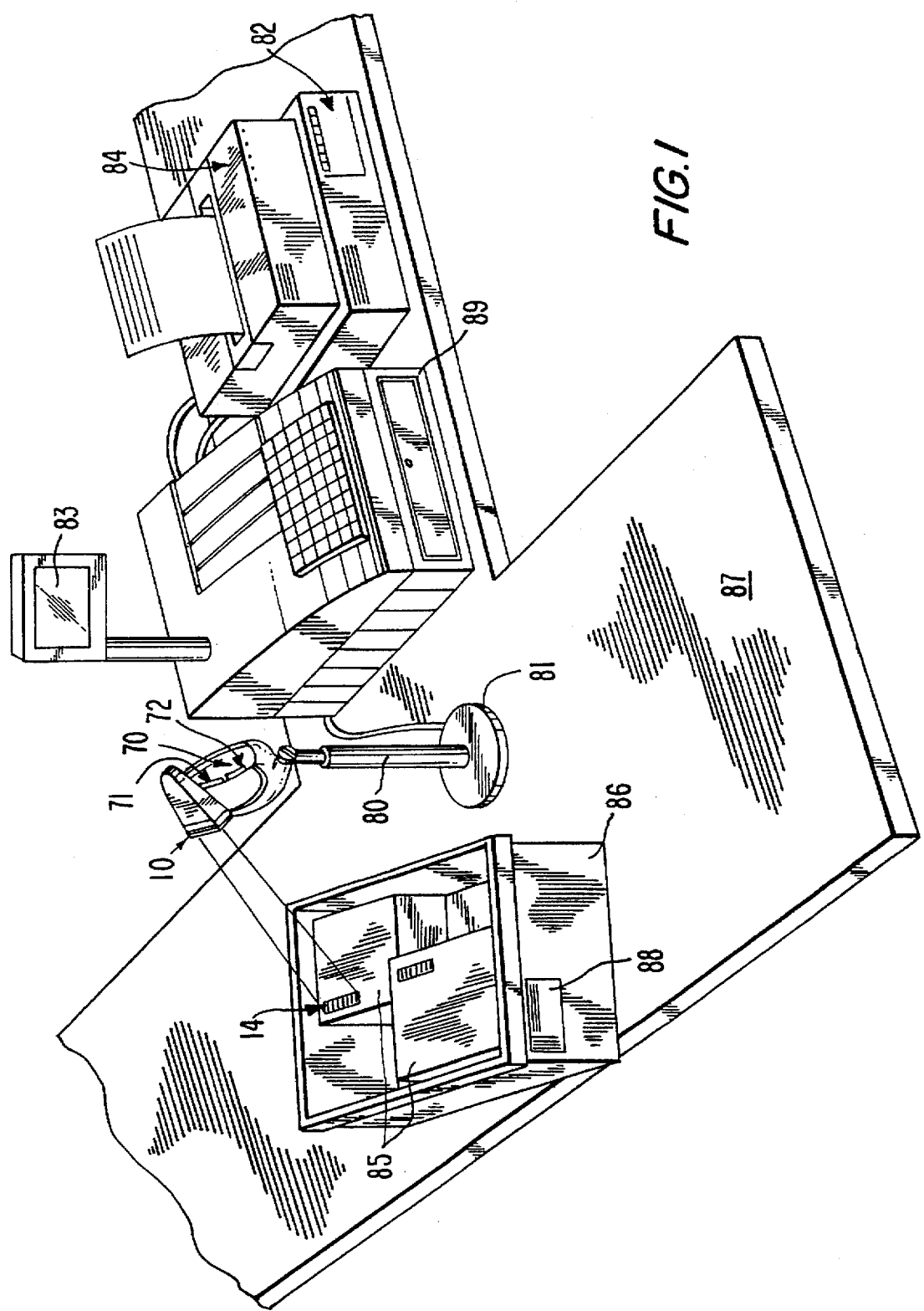
FIG. 1 is a view of a bar code reader system with dual trigger switches in a point-of-sale application environment according to the present invention.

In the point-of-sale system depicted in FIG. 1, merchandise or articles 85 having a one-dimensional bar code symbol 14 are arranged on a counter 87 on which the bar code reader 10 is mounted. The articles 85 are shown placed in a shopping tote 86 which includes an RF identification (ID) tag 88. In one application, the bar code symbols may identify the merchandise, while the RF ID tag 88 may identify the shopper or customer. In another application, the tote 86 may be a shipping container, and the RF ID tag denotes the destination, routing, or shipping address. An RF ID tag detector 69 (shown in FIG. 3) may be included as part of the system. The system may employ both methods of identification, as will be subsequently described.

FIG. 1 shows a bar code reader 10 capable of both stationary and hand-held operation with dual triggers according to the present invention. The reader housing is depicted in the shape similar to the gun-shaped housings known in the prior art. The reader 10 may be picked up by the user for portable use, or mounted in a stand 80 in which the reader can function operating in a fixed mode. In the fixed mode, it is positioned to read the bar code symbol 14 on a target within the field of view of the reader, such as a region of the counter 87. The reader 10 may make electrical contacts to the stand 80, which in turn may be connected to a cash register 89 and/or host computer 82 which may include elements such as a display 83 and a printer 84. In the present invention, the handle position 72 of the housing 10 (i.e., the portion of the housing which is gripped by the user's hand in normal use) includes two discrete trigger switches 70 and 71. The upper switch 70, designed to be activated by the index finger, controls one function or operation, while the lower switch 71, designed to be activated by different fingers, controls a different operation, as will be described below. The switches 70, 71 are independently operable and, hence, either one can be operated before, after, or simultaneously with, the other.

Alternatively, in another embodiment, a single two-position trigger switch may be used in place of dual trigger switches. Examples of functions that may be performed by activation of the first and second positions of a dual or two-position trigger switches are as follows:

1) Position One—aim; Position Two—scan.
2) Position One—scan; Position Two—EAS deactivate.
3) Position One—scan; Position Two—RF ID.
4) Position One—scan; Position Two—transfer data or operate peripheral (e.g., printer, communication and display)

Examples of functions that may be performed with a single trigger with three trigger positions are as follows:

1) Position One—aim; Position Two—scan; Position Three—EAS deactivate.
2) Position One—aim; Position Two—scan; Position Three—RF ID.
3) Position One—scan; Position Two—RFID; Position Three—EAS deactivate.

As used above, the term "EAS deactivate" refers to an operation of deactivating an EAS tag on the article. Reference may be made to U.S. Pat. No. 5,005,125 to describe EAS systems and tags, and their method of deactivation, and to European Patent No. 0355355. The term "RF ID" refers to reading an RF ID tag, such as described in U.S. Pat. No. 4,739,328.

The sequence and operations described above are merely illustrative, and a particular point-of-sale check-out, shipping, a distribution system or other application may use other sequences or combinations rather than the ones described above.

Figures 2A, 2B:
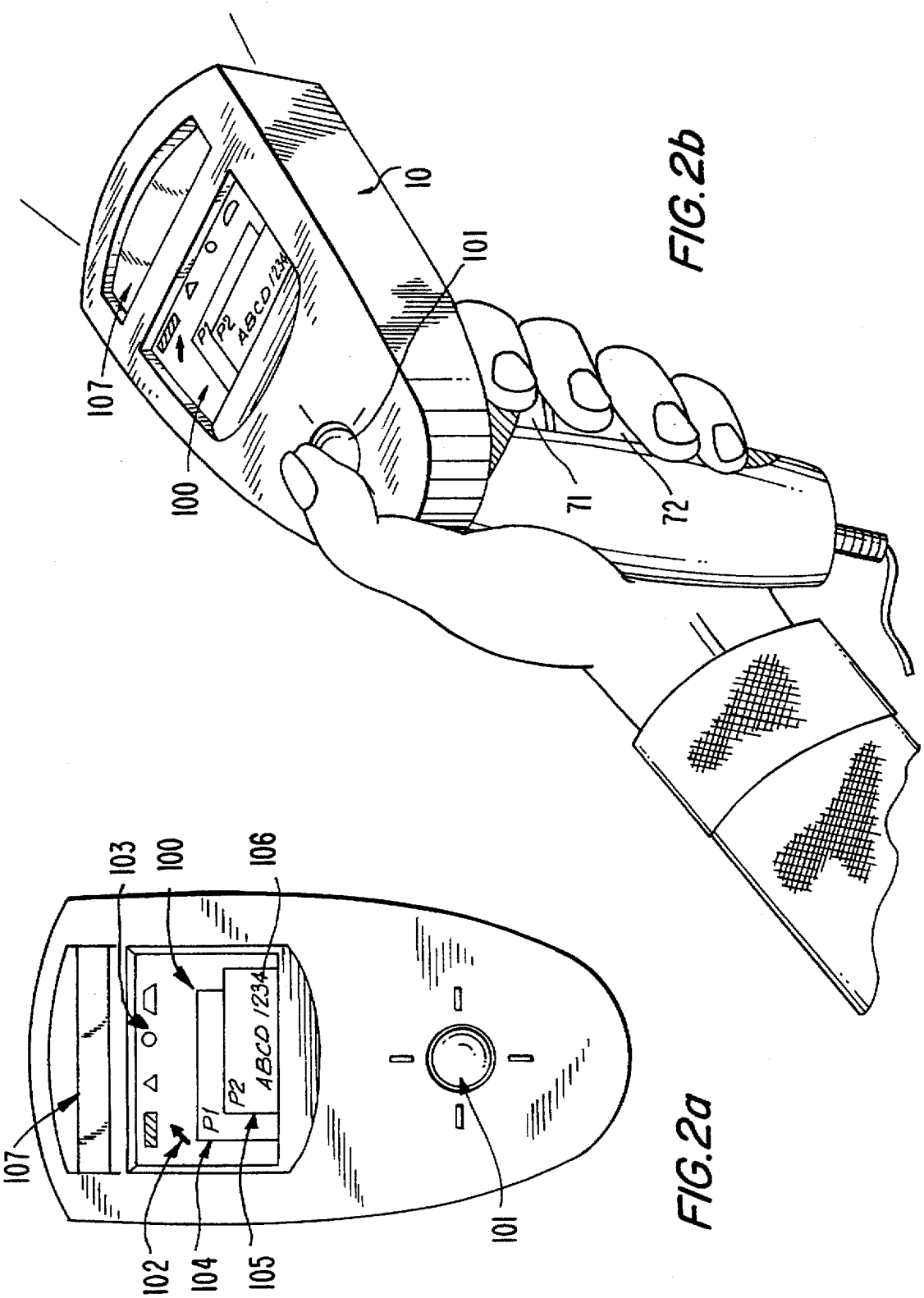
Figure 2C:
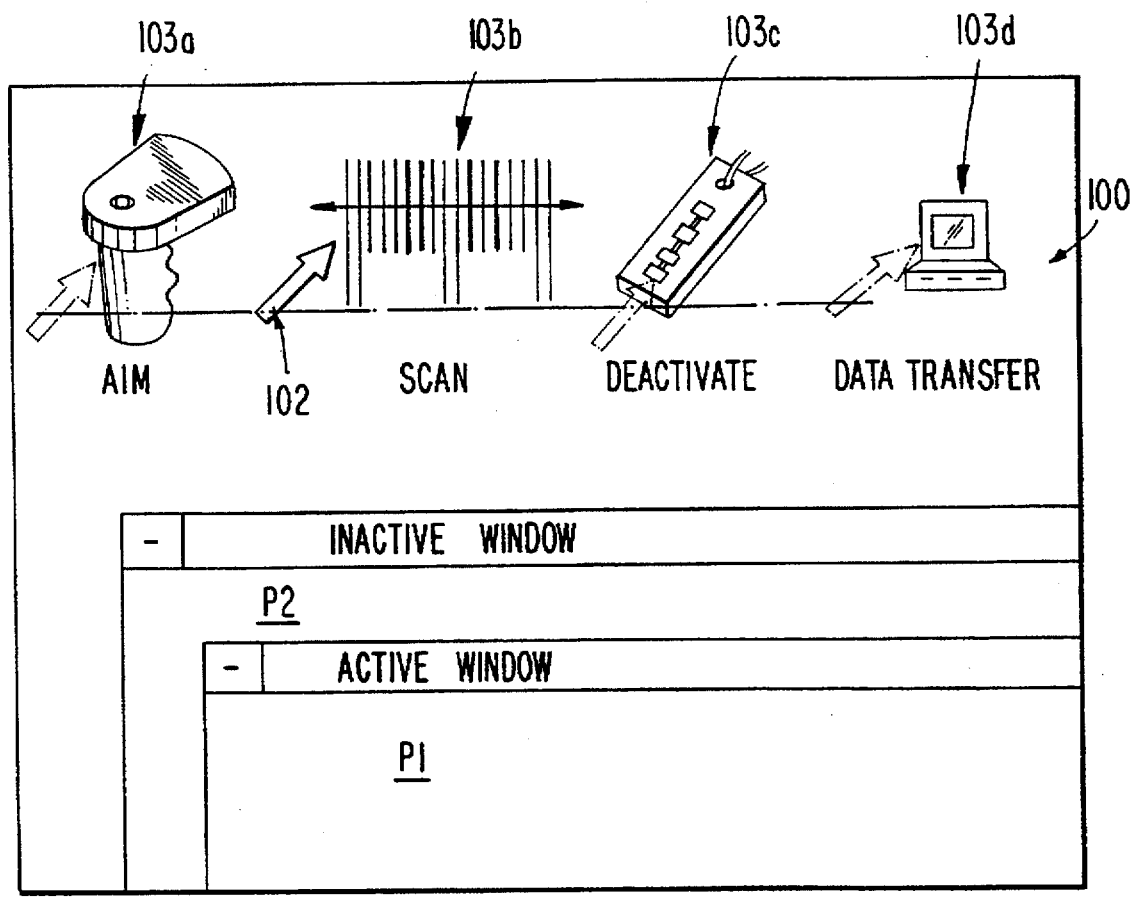

FIG. 2a illustrates the top plan view and FIG. 2b a perspective view of the reader 10 now shown as incorporating a display 100 and a trackball, also known as a joystick 101. The joystick may be moved by the user's thumb to move an arrow-shaped pointer 102 or indicating cursor on the display screen 100. As best shown in FIG. 2c, the display 100 may display icons 103 which in a particular programming environment or graphical user interface may be used to refer to specific program applications, documents, or data records that may be accessed by the system. Thus, FIG. 2c shows an "AIM" icon 103a, a "SCAN" icon 103b, a "DEACTIVATE" icon 103c, and a "DATA TRANSFER" icon 103d. When the pointer 102 is moved among the phantom line positions shown in FIG. 2c, and is aligned with the desired icon, the user can select the application or document represented by the icon by activating a switch by pressing the joystick 101 to cause it to "click" and thereby register to the system the selected icon as representing the particular application, document, or data record desired to be accessed, executed or displayed. Thus, aiming, scanning, tag deactivating and data transferring are executed in response to selecting icons 130a–d, respectively. As examples of the type of documents which may be displayed, two "windows" representing distinct programs P1 and P2 are displayed with the "active" or overlapping one 105 displaying data 106.

FIGS. 2a and 2b also illustrate a solar cell collector 107 which functions to power the reader and/or charge a battery contained within the reader housing 10. In applications in which the stand 80 may be utilized in a location remote from the host computer 82 or other power source, it is advantageous to provide separate means for powering the reader. A solar power battery charger coupled to the solar cell collector 107 achieves this objective in one embodiment of the present invention.

As alternatives to the use of solar cells, microwave or heat energy sources could also be used. In the first variant, a microwave transmitter is installed in the close vicinity of the device (e.g., in the cash register around which a cordless scanner is used). This could be either the transmitter utilized to communicate with the portable device or one which is specific to this task. For both cases, its frequency could be either the same as the one utilized for the communication channel or a different one. Because of regulatory and safety/health issues, in most practical situations only low power levels should be generated.

Alternatively, heat generated in the device could be used, derived from the inherent inefficiency of its components. For example if $\Omega_1$, is the device inefficiency (which results in heat generation), and $\Omega_2$ is the process efficiency of converting heat to electricity, then a fraction of $\Omega_1 \times \Omega_2$ of the battery energy can be used for its charging.

Thus, another feature of the present invention is to provide a system for electro-optically reading indicia having parts of different light reflectivity, a scanning head with a housing; a DC voltage-powered light source mounted in the housing for generating a light beam that may be directed toward an indicium for reflection therefrom; a sensor for detecting light of variable intensity reflected off the indicia and for generating a signal indicative of the indicia; a battery in the housing for supplying DC voltage to the light source; and a solar cell powered charger for charging the battery in the housing.

In one embodiment of the invention, a primary battery is placed in the device: Primary (non-rechargeable) batteries generally have energy density larger than that of secondary batteries (e.g., ≈100 Wh/kg for an alkaline cell vs. ≈30 Wh/kg for a standard Ni—Cd cell). However, this large capacity is substantially reduced at large discharge rates. Devices that operate in short "bursts" during the session (e.g., bar code scanners), do create a high rate of drain on the battery. In the preferred embodiment, the primary battery provides a substantially small charge current to the second battery. The secondary (rechargeable) battery is the power source which directly powers the device, and is continuously recharged at a low level ("trickle charge") throughout the session, while maintaining the cordless mode of operation. The secondary battery can be used to deliver the same overall apparent capacity to the user. In this particular case, at the end of the session the primary battery is replaced and the secondary battery is recharged. However, the overall combination provides for a session which is longer than if a single battery type were used (assuming the same total battery weight).

The following is an illustrative example (specific values used are approximate only). Assume that a device is powered by a 3.6V battery (a series combination of three 1.2V cells) and a maximum of 100 g is allocated for the battery. If only a primary cell is used, then its density is 40 Wh/kg (because of the assumed high drain rate). This will translate to a capacity of (40 Wh/kg×(0.1 kg)/(3.6V)=1.11 Ah. Similarly, if a secondary battery is used, the resulting capacity is (30 Wh/kg)×(0.1 kg)/(3.6V)=0.83 Ah. If a combination of 50 g primary and 50 g secondary are used, (where the primary battery is used to trickle charge the secondary one, and thus its higher density is achieved), then the total capacity for this case is (100 Wh/kg)×(0.05 kg)/(3.6V)+(30 Wh/kg)×(0.05 kg)/(3.6V)=1.39 Ah+0.42 Ah=1.81 Ah, which is a substantial increase over the previous alternatives.

The following is another illustrative example. Assume a device which normally operates at 3V with a 500 mAh battery in 8-hour shifts ("sessions"). Using the concept of this invention, the device is redesigned to operate with a 250 mAh battery. The additional 250 mAh capacity is to be supplied via the trickle charge. The required charging current is thus (250 mAh)/(8 hours)=30 mA. At 3V operation, this corresponds to 90 mW. Assuming 10% power conversion efficiency of solar cells, about 900 mW of ambient light is required to impinge upon the solar cell area. In full sunlight, the intensity is approximately 100 mW/cm$^2$, and in this case a total solar cell area of 9 cm$^2$ will be required. Indoor operation with normal lighting conditions will require substantially larger areas.

Figure 3:
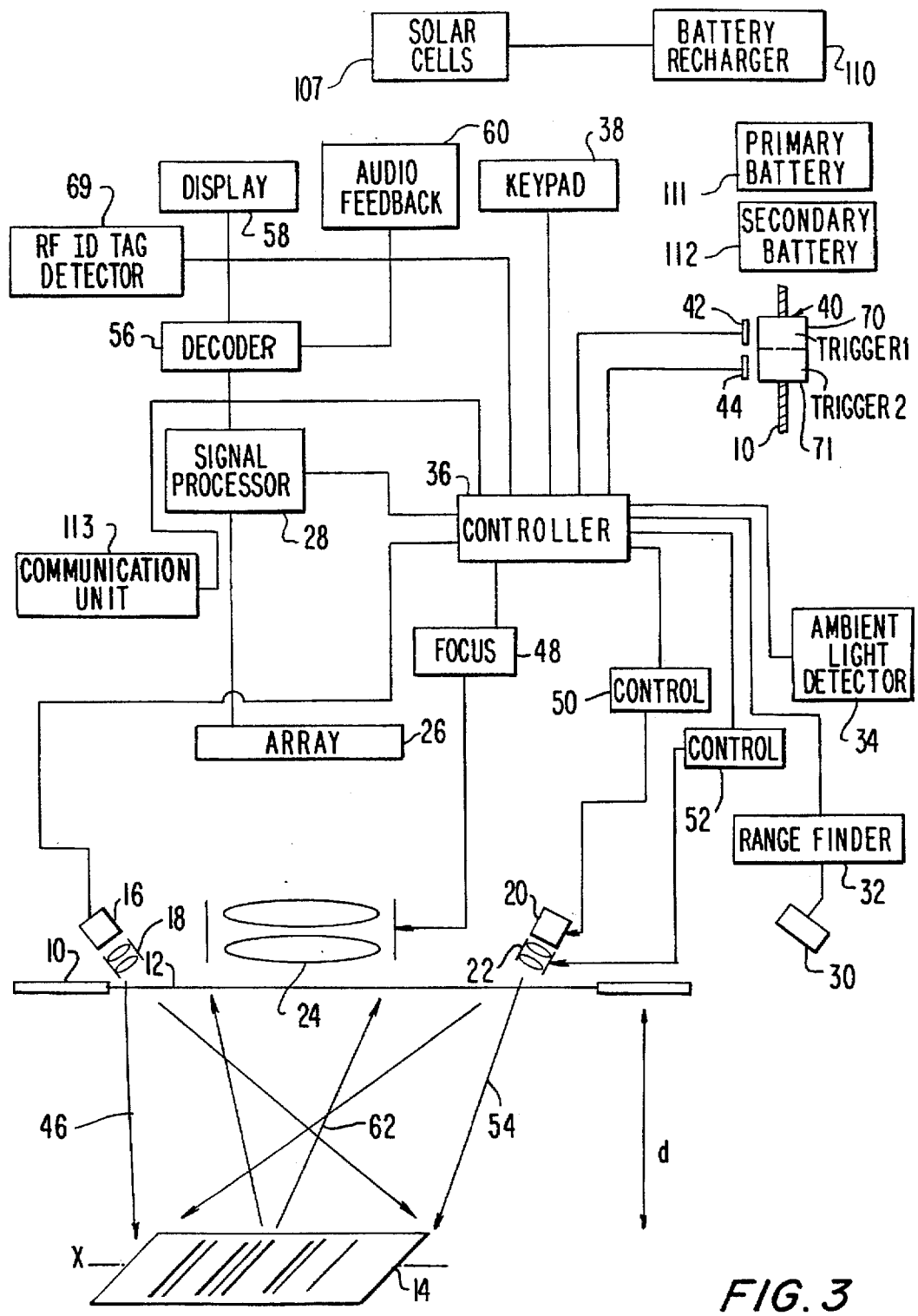
FIG. 3 is a schematic block diagram of the preferred embodiment of the internal optical and electronic elements of the present invention.

Turning to FIG. 3, the housing 10 has a window 12 therein, which is arranged to be positioned by the user opposite a bar code symbol or other indicia 14 to be read. Behind the window 12 is an illumination source, such as a laser 16, with optics 18, an illuminating LED or laser 20, with optics 22, and collection optics 24. Behind the collection optics 24 is a detector or a two-dimensional imaging array 26 such as a CCD array which is arranged to be read out by signal processing circuitry 28. Instead of being a CCD array, the array 26 could comprise any two-dimensional solid-state imaging device; it could, for example, comprise a random-access device. Also provided is a detector 30 coupled to range finder circuitry 32, the purpose of which is to automatically determine the distance d between the window 12 and the indicia 14 which is to be read. The range finder may operate by any desired means, such as by ultrasound or optically. There is also an ambient illumination detector 34 which senses the ambient illumination conditions. The solar cells 107, battery recharger 110, primary battery 111, and secondary battery 112 are also depicted.

Operation of the device is overseen by a common microprocessor or controller 36, operated by means of a keypad 38 and a trigger mechanism 40. The trigger mechanism incorporates dual trigger switches 70, 71, such as shown in FIG. 1, having first switch contact 42 and second switch contact 44.

In use, the operator first pulls the first trigger 70 back to a first position, in which it meets the contact 42. This causes the controller 36 to actuate the laser 16 to produce a visible aiming beam 46 which the operator then manually aligns with the indicia 14. The aiming beam preferably produces a static pattern, or designation pattern, preferably a point or a line which is easily visible. Ideally, the optical system 18 incorporates a cylindrical lens, such as that previously described in copending U.S. patent application Ser. No. 08/268,913 noted above in the Reference to Related Applications, to produce a solid line of light which can quite easily be aligned with the longitudinal axis of the bar code symbol.

Once the operator has properly aligned the reader, the operator then pulls the second trigger 71 which closes the contact 44. This causes the controller 36 to instruct the range finder 32 to determine the distance d. On the basis of that determination, and on the basis of information provided by the ambient illumination detector 34, the controller 36 determines the optimal focusing, magnification and illumination parameters that will be required to decode the image. The controller then sends signals to a focus and magnification control mechanism 48, which adjusts the imaging optics 24, to an illumination control 50, which adjusts the illumination provided by the laser 20, and to a further control 52 for adjusting the optics 22, thereby adjusting the area and/or intensity of the illuminating beam 54 which will subsequently be produced.

Once all the parameters have been determined, and the necessary adjustments made, the controller 36 switches off the laser 16 and switches on the LED or laser 20 for a predetermined period, thereby illuminating the indicia 14 with the beam 54. If the adjustments have correctly been made, the beam will be an optimized match with the size of the code at the measured distance d. An estimate of the apparent size of the code, as seen from the window, can be determined from the known actual size of the code (where available), which may have been entered in advance by means of the keyboard 38.

The indicia 14 is imaged onto the two-dimensional semiconductor array 26, which is then read out by the signal processing circuitry 28. The signals are then decoded by a decoder 56. Feedback is provided to the operator by means of a display 58 and/or audio feedback means 60.

Once the image has been satisfactorily captured, processed and decoded, the controller may automatically instruct the reader to switch itself off, or alternatively to move into a low-power quiescent mode.

In a first variation of the preferred embodiment shown in FIG. 3, the rangefinder 32 and the detector 30 may be omitted. Instead, determination of the distance d may be achieved by analyzing the reflected light 62 which is returned from the symbol as it is being illuminated by the target beam 46. For example, the beam 46 may be pulsed, and temporal measurements may be taken to determine the distance. Alternatively, the beam 46 may be scanned across the indicia, in which case the spectral characteristics of the received signal may provide some indication of the distance. Yet a further alternative is to calculate phase relationships within the reflected light.

A further variation is to replace the lasers 16,20 with a single laser, and the optics 18,22 with a single set of optics. In such an arrangement, the same laser operates to produce the aiming beam (designating pattern) 46 and the imaging illuminating beam 54. Such an arrangement is, of course, only of assistance where the laser produces light of a wavelength which can easily be seen by the operator.

Instead of the trigger 40 being a dual trigger, or two-position trigger, it could be a multi-position trigger. The various trigger positions could undertake a variety of functions; for example, one trigger position might produce a first static pattern (designation pattern), with a second position producing a second pattern, and a third position producing the measurement illumination. This type of arrangement could be useful where the device is to be used in a variety of situations, or with a variety of different bar code symbols, since it would then be possible for top operator to choose an appropriate designation pattern for the indicia which is to be measured. Other trigger positions of a multi-position trigger could provide an on/off function, or other functions for controlling the information shown on the display 58, such as deactivation of an EAS tag, reading of an RF ID tag, or activation of a peripheral device, such as a modem, radio, infrared transmission unit or other communications device, or a peripheral device such as a printer. One example would be initiating wireless communication of the data represented by the symbol through a communication unit 113 connected to the controller 36. Different trigger positions could also be provided to alter the measurement characteristics of the device, for example to provide at least a certain level of manual control over the focusing and/or magnification, such as zooming or spot size adjustment. All of these features will, of course, be controlled by the controller 36.

Instead of, or in addition to, the trigger 40, the aforementioned graphical user interface depicted in FIGS. 2a, 2b and 2c, is useful in performing system functions. Thus, as described above, the user's thumb is used to move the joystick 101 and position the pointer 102 on a selected icon, thereby "highlighting or selecting" the function associated with that icon. Thereupon, either the thumb, is used again to depress the joystick, or one of the user's other fingers is used to depress one of the trigger switches 71 or 72, thereby "choosing or executing" the selected function.

While the preferred form of the optical reader, already described, is a portable, hand-held device, various other options are possible. The embodiment shown in FIG. 3 could, instead, represent a fixed embodiment which is arranged to be built into a point-of-sale unit, for example above a conveyor. The automatic magnification/focus controls enable the device to deal with a variety of different sized packages, passing along the conveyor, thereby presenting bar code symbols at a variety of different distances from the device.

It will be understood that each of the elements described above, or any two or more together, also may find a useful application in other types of constructions differing from the types described above.

While the invention has been illustrated and described as embodied in an optical reader having an independent triggering mechanism and graphical user interface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should be and are intended to be comprehended within the meaning and range of equivalents of the following claims.

What is claimed as new and desired to be protected by letters patent is set forth in the appended claims.

We claim:

1. A system for electro-optically reading indicia having parts of different light reflectivity, comprising:
   a housing;
   a scanner supported by the housing, for scanning at least one of a light beam directed at an indicium to be read, and a field of view extending over the indicium, said scanner having a component energizable by DC voltage; and
   an energy collector supported by the housing, for collecting energy radiated from a radiant energy source for supplying the DC voltage to power said scanner component.

2. The system of claim 1, and further comprising a rechargeable battery supported by the housing for supplying the DC voltage; and further comprising a battery recharger; and wherein the energy collector is electrically connected to the battery recharger for charging the battery.

3. The system of claim 2, and further comprising a primary, non-rechargeable battery supported by the housing.

4. The system of claim 1, wherein the energy collector includes solar cells for collecting solar energy radiated from ambient light.

5. The system of claim 4, wherein the housing has a top wall, and wherein the solar cells are arranged on the top wall.

6. The system of claim 1, wherein the scanner component is a light source for generating the light beam.

7. The system of claim 1, wherein the scanner includes a sensor for detecting light of variable intensity reflected off the indicium, and for generating a signal indicative of the indicium.

8. The system of claim 7, wherein the sensor is a charge-coupled device array.

9. A method of electro-optically reading indicia having parts of different light reflectivity, comprising the steps of:
   a) scanning at least one of a light beam directed at an indicium to be read, and a field of view extending over the indicium, said scanning being performed by a DC voltage-powered component; and
   b) collecting energy radiated from a radiant energy source, for supplying DC voltage to power said component.

10. The method of claim 9, wherein the collecting step is performed by collecting solar energy radiated from ambient light, and by converting the collected solar energy to electrical power for charging a battery recharger.

* * * * *